Nov. 3, 1942.                J. D. MINER, JR                2,301,170
                              ELECTRIC MOTOR
                             Filed Oct. 1, 1940
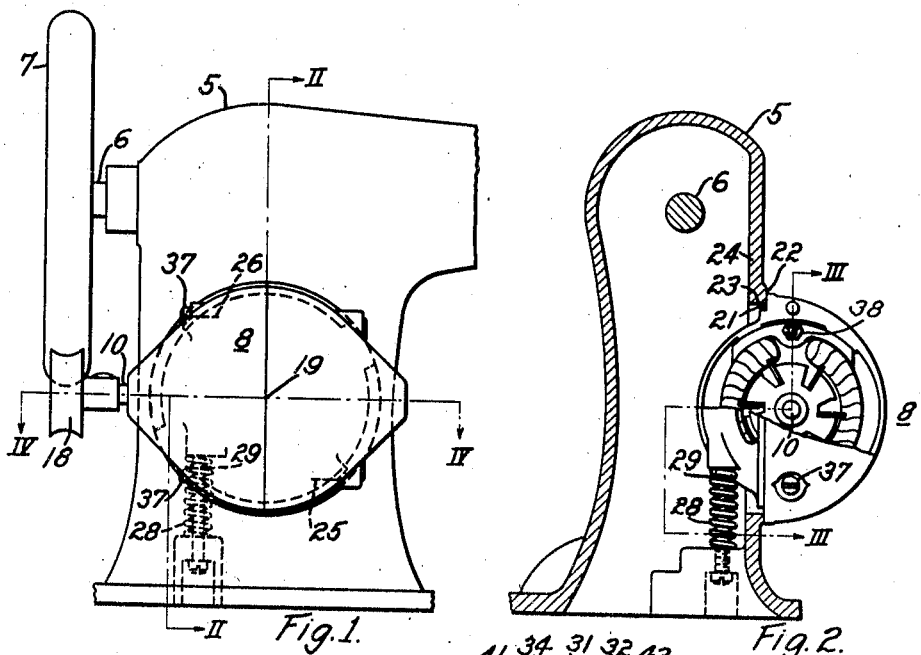
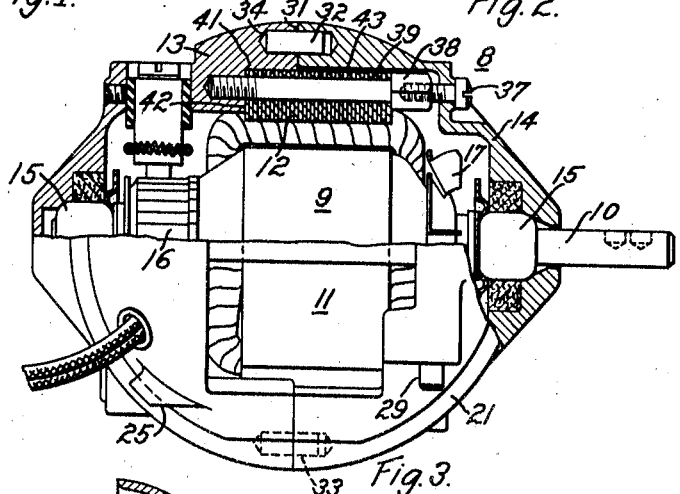
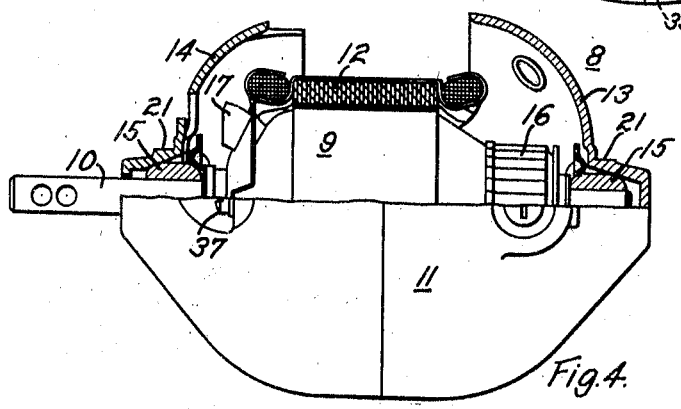
INVENTOR
*John D. Miner, Jr.*
BY
*O. B. Buchanan*
ATTORNEY Patented Nov. 3, 1942

2,301,170

UNITED STATES PATENT OFFICE 2,301,170

ELECTRIC MOTOR

John D. Miner, Jr., Lima, Ohio, assignor to Westinghouse Electric & Manufacturing Company, East Pittsburgh, Pa., a corporation of Pennsylvania Application October 1, 1940, Serial No. 359,218

4 Claims. (Cl. 172—36)

My invention relates to electric motors and it has particular relation to motors which are adapted to be rotatably mounted, on one side, in a bayonet-joint, so that the entire motor may be rotated about an axis at right angles to its shaft, such motors being commonly utilized for driving sewing machines, although, in its broader aspects, my invention is not altogether limited to such motor-applications.

An object of my invention is to provide a better and less expensive motor-frame in which two cup-shaped, abutting brackets are positively aligned, as to both lateral and angular movements, by means of two dowel pins extending into the abutting edges of the brackets. This feature is of general utility, in motor-design, and it is particularly needed in bayonet-mounting sewing-machine motors which have heretofore been subject to trouble, in designs prior to my present invention, because it was previously almost impossible to prevent some relative rotation of the two motor-brackets with respect to each other, which would offset the two halves of the bayonet mounting, causing the motor to fit too tightly in the bayonet-joint, so that it would not rotate freely in a manner which was required in order that its driving pulley should press tightly against the handwheel of the sewing machine. Heretofore, when such rotational slippage of the brackets has occurred, it has been necessary or customary to pound the motor-frame so as to cause it to rotate freely in its bayonet-mounting support, as a result of which the two bearings would sometimes get out of alignment with each other, and cause bearing-trouble.

A further object of my invention is to provide a much more economical construction, in which the number of machined surfaces is considerably reduced, and in which the machining operations are very much simplified by avoiding the necessity for the concentric machined registers or interlocking circular shoulders on the abutting ends of the two brackets of the motor-frame. In accordance with my improved design, the magnetizable core-member of the stator part of the motor is fitted snugly within one of the cup-shaped brackets, while the other bracket fits loosely around said core, so as to be readily removable therefrom, thereby providing a much more economical structure, as well as a more satisfactory structure.

With the foregoing and other objects in view, my invention consists in the structures, combinations, methods, systems and parts hereinafter described and claimed, and illustrated in the accompanying drawing, wherein:

Figure 1 is a front view of a portion of a sewing-machine head with one of my improved motors applied, Fig. 2 is a cross sectional view approximately on the section-line II—II of Fig. 1, with some of the parts shown in elevation.

Fig. 3 is a rear elevational view of the motor, with its upper portion in section on the line III—III of Fig. 2, and Fig. 4 is an enlarged top plan view of the motor, with the back half thereof in section, on the line IV—IV of Fig. 1.

My present invention is an improvement over a type of sewing-machine motor which has been in use for many years, as shown in a Garcelon and Hansen Patent 1,504,615, granted August 12, 1924, and assigned to the Westinghouse Electric & Manufacturing Company. As shown in said patent, I have shown my improved motor as being mounted on a sewing-machine head 5 which is provided with an operative shaft 6 having a handwheel 7 thereon.

Certain features of my motor are the same as, or similar to, the old motor which is shown in the aforesaid Garcelon and Hansen patent. My motor 8 comprises a rotor member 9 mounted upon a shaft 10, and a stator member 11 comprising a magnetizable core-member 12 and two cup-shaped abutting brackets 13 and 14 each provided with a journal-bearing 15 for the motor-shaft 10. The motor 8 is usually of a series commutator type, so as to be universally operative upon either alternating-current or direct-current circuits, and it is so illustrated. Thus, it is provided with a commutator 16 at one end of the rotor, usually called the front end. The motor is also illustrated as being ventilated by means of a fan 17 carried by the end of the rotor-member 9, within the rear bracket 14. The motor-shaft 10 extends out of the motor-frame, through the rear bracket 14, and is provided with a driving-pinion 18 which presses against the handwheel 7 of the sewing machine.

As in previous sewing-machine motors of this type, my motor, as illustrated, is provided with bayonet-joint supporting-means for so supporting the motor that it is free to turn about a horizontal axis 19, at right angles to the motor-shaft 10. To this end, the front and rear brackets 13 and 14 of the stator-member 11 are provided with a circular-shouldered mounting-abutment 21 (Figs. 2, 3 and 4), which rests upon the rim 22 of a hole 23 in the front plate 24 of the sewing-machine head 5, as indicated in Fig. 2. The motor is loosely retained in place, so that the whole motor, frame and all, is free to rotate around, in the hole 23, about the previously mentioned horizontal axis 19 which constitutes the center of said hole 23. The motor is retained in place, within said hole 23, by means of two diametrically disposed bayonet-joint lugs, one of which is shown at 25 (Fig. 3) in the front bracket 13. The diametrically opposite retaining-lug 26 is provided in the rear bracket, as indicated at 26 in Fig. 1. Both of the retaining-lugs 25 and 26 engage the rear surface of the front plate 24 of the sewing-machine head, in such manner as to provide a bayonet-joint therewith. The rear end of the motor is yieldably pressed upwardly by means of a spring 28 which engages a centering lug 29 which is provided in the rear bracket 14 for this purpose, so that the driving-pinion 18 is yieldably pressed up into operative engagement with the handwheel 7 of the sewing machine.

In accordance with my present invention, a novel stator-construction is provided for the motor 8. The abutting edges of the two cup-shaped brackets 13 and 14 terminate in flat non-interlocking surfaces 31 (Fig. 3) in a transverse plane at right angles to the shaft 19, and also at right angles to the plane of the circular-shouldered mounting-abutment 21 which constitutes a part of the rotatable bayonet-joint mounting for the motor. I have avoided the previous expedient of providing a shouldered or interlocking machined fit between the abutting ends of the brackets 13 and 14, and in lieu thereof, I have utilized the plane abutting surfaces 31, without any machined interlocking shoulders therebetween; and I have also provided two dowel pins 32 and 33 (Fig. 3) extending into the abutting edges 31 of the brackets 13 and 14 in a direction at right angles to the transverse plane of said abutting edges 31, for positively aligning said brackets as to both lateral and angular movements. Thus, the pin 32 may be tightly carried by the rear bracket 14, and it may movably, but without excessive loose play, extend into a hole 34 provided in the front bracket 13, as clearly shown in Fig. 3. These dowel pins 32 and 33 thus not only avoid the necessity for providing interfitting shoulders for keeping the abutting edges of the front and rear brackets 13 and 14 from becoming laterally misaligned with respect to each other, but they also absolutely prevent any relative twisting movement, or angular displacement, between the two brackets 13 and 14, thus avoiding any possible chance of the two halves of the bayonet-joint shoulder-mounting 21 from becoming misaligned, so as to cause the motor-mounting to become jammed in the hole 23 in the sewing-machine head 5.

The two brackets 13 and 14 are held against separation from each other in an axial direction by bolt-means in the form of two set-screws 37 which extend through the rear bracket 14 into screw-threaded engagement with the head of a through-bolt 38 which holds the stator-core 12 assembled within the front bracket 13, as shown in Fig. 3. It will be noted that the bolt-means, comprising the set-screws 37 and the through-bolts 38, do not definitely or reliably and accurately restrain the brackets 13 and 14 as to either lateral or angular movements, because the through-bolts 38 must necessarily extend, with a certain degree of looseness, through holes 39 provided in the stator core-member 12, so that the through-bolts 38, together with their attached set-screws 37, are susceptible of a certain amount of lateral displacement or twisting, which is not true of the dowel pins 32.

It is a novel feature of my invention that the stator core-member 12, as shown in Fig. 3, is snugly fitted into a bored surface 41 within the front bracket 13, so that the front end of the stator core 12 abuts against a transverse machined surface 42 within the front bracket 13, the parts being held together by the previously mentioned through-bolts 38. On the other hand, the rear bracket 14 slides over the stator core-member 12 with a relatively loose fit, as indicated at 43 in Fig. 3, so that the rear bracket 14 may be readily disassembled, without disturbing the other parts, by the simple expedient of removing the set-screws 37. This constitutes a much more efficient, and a much cheaper, stator-member assembly, than previous constructions, eliminating much of the machining which has been previously necessary, and simplifying the clamping of the stator core-member 12 into the front bracket 13 of the motor.

I claim as my invention:

1. A rotatably mounted electric motor having a rotor-member including a shaft, a stator-member comprising two cup-shaped, abutting brackets each provided with a journal-bearing for said shaft, the stator-member being provided with a circular-shouldered mounting-abutment in a plane parallel to the axis and displaced to one side of the axis, and supporting-means for so supporting the motor that it is free to turn about said circular-shouldered mounting abutment on an axis at right angles to said shaft, characterized by the abutting edges of the two cup-shaped brackets terminating in flat non-interlocking surfaces in a transverse plane at right angles to the shaft and at right angles to the plane of the circular-shouldered mounting-abutment, a plurality of dowel pins extending into the abutting edges of the brackets at approximately right angles to said transverse plane for positively aligning said brackets as to both lateral and angular movements, and bolt-means for holding said brackets against separation from each other in an axial direction without definitely restraining said brackets as to either lateral or angular movements.

2. A rotatably mounted electric motor having a rotor-member including a shaft, a stator-member comprising a magnetizable core-member and two cup-shaped, abutting brackets each provided with a journal-bearing for said shaft, the stator-member being provided with a circular-shouldered mounting-abutment in a plane parallel to the axis and displaced to one side of the axis, and supporting-means for so supporting the motor that it is free to turn about said circular-shouldered mounting-abutment on an axis at right angles to said shaft, characterized by one of said cup-shaped brackets having a snug fit around said magnetizable core-member and the other bracket having a loose fit therearound, and further characterized by the abutting edges of the two cup-shaped brackets terminating in flat non-interlocking surfaces in a transverse plane at right angles to the shaft and at right angles to the plane of the circular-shouldered mounting-abutment, a plurality of dowel pins extending into the abutting edges of the brackets at approximately right angles to said transverse plane for positively aligning said brackets as to both lateral and angular movements, and bolt-means for holding said brackets against separation from each other in an axial direction without definitely restraining said brackets as to either lateral or angular movements.

3. An electric motor having a rotor-member including a shaft, and a stator-member comprising a magnetizable core-member and two cup-shaped, abutting brackets each provided with a journal-bearing for said shaft, characterized by one of said cup-shaped brackets having a snug fit around said magnetizable core-member and the other bracket having a loose fit therearound, and further characterized by the abutting edges of the two cup-shaped brackets terminating in flat non-interlocking surfaces in a transverse plane at right angles to the shaft, a plurality of dowel pins extending into the abutting edges of the brackets at approximately right angles to said transverse plane for positively aligning said brackets as to both lateral and angular movements, and bolt-means for holding said brackets against separation from each other in an axial direction without definitely restraining said brackets as to either lateral or angular movements.

4. An electric motor having a rotor-member including a shaft, and a stator-member comprising a magnetizable core-member and two cup-shaped, abutting brackets each provided with a journal-bearing for said shaft, characterized by the abutting edges of the two cup-shaped brackets terminating in flat non-interlocking surfaces in a transverse plane at right angles to the shaft, a plurality of dowel pins extending into the abutting edges of the brackets at approximately right angles to said transverse plane for positively aligning said brackets as to both lateral and angular movements, and bolt-means for holding said brackets against separation from each other in an axial direction without definitely restraining said brackets as to either lateral or angular movements.

JOHN D. MINER, Jr.